US011131972B2

(12) United States Patent
Glaser et al.

(10) Patent No.: US 11,131,972 B2
(45) Date of Patent: Sep. 28, 2021

(54) PERFORMANCE OPTIMIZATION IN A BUILDING AUTOMATION SYSTEM

(71) Applicant: Trane International Inc., Davidson, NC (US)

(72) Inventors: Jonathan Glaser, Maplewood, MN (US); Udhaya Kumar Dayalan, White Bear Lake, MN (US); Thomas Christopher Basterash, White Bear Lake, MN (US)

(73) Assignee: Trane International Inc., Davidson, NC (US)

( * ) Notice: Subject to any disclaimer, the term of this patent is extended or adjusted under 35 U.S.C. 154(b) by 351 days.

(21) Appl. No.: 15/404,559

(22) Filed: Jan. 12, 2017

(65) Prior Publication Data
US 2018/0196402 A1    Jul. 12, 2018

(51) Int. Cl.
*G05B 19/042* (2006.01)
*G05B 15/02* (2006.01)

(52) U.S. Cl.
CPC .......... *G05B 19/042* (2013.01); *G05B 15/02* (2013.01); *G05B 2219/2642* (2013.01)

(58) Field of Classification Search
CPC .................. G05B 19/042; G05B 15/02; G05B 2219/2642
See application file for complete search history.

(56) References Cited

U.S. PATENT DOCUMENTS

| 6,636,893 | B1 | 10/2003 | Fong |
| 6,679,072 | B2 | 1/2004 | Pham et al. |
| 6,725,180 | B2 | 4/2004 | Mayer et al. |
| 7,243,044 | B2 | 7/2007 | McCalla |
| 7,451,017 | B2 | 11/2008 | McNally |
| 7,528,981 | B2 | 5/2009 | Johnson et al. |
| 7,818,270 | B2 | 10/2010 | Carey et al. |
| 8,600,556 | B2 | 12/2013 | Nesler et al. |
| 8,660,708 | B2 | 2/2014 | Narayanamurthy et al. |
| 8,719,184 | B2 | 5/2014 | Buchanan |
| 8,719,185 | B2 | 5/2014 | Carey et al. |
| 8,788,097 | B2 | 7/2014 | Drees et al. |
| 8,818,758 | B1 * | 8/2014 | Singh ...................... G06F 21/81 |
| | | | 702/182 |
| 8,862,415 | B1 | 10/2014 | Adams |
| 8,880,231 | B2 | 11/2014 | Boucher et al. |

(Continued)

*Primary Examiner* — Nathan L Laughlin
(74) *Attorney, Agent, or Firm* — Womble Bond Dickinson (US) LLP

(57) ABSTRACT

Systems and methods of improving building automation system (BAS) performance includes collecting performance parameters associated with building automation devices, comparing the parameters to a benchmark, and adjusting the performance benchmark to match the corresponding performance parameter if the corresponding performance parameter exceeds the performance benchmark, or utilizing the performance parameter and the identity of the building automation device associated therewith to remediate the performance defect. The collected performance parameters may be used to prioritize system tasks based on current system performance. A performance monitoring agent included in a building automation system controller or a device controller determines a performance parameter thereof to assess and benchmark BAS performance.

18 Claims, 6 Drawing Sheets

(56) References Cited

U.S. PATENT DOCUMENTS

| | | |
|---|---|---|
| 8,977,405 B2 | 3/2015 | Shiel |
| 9,026,400 B2 | 5/2015 | Chen et al. |
| 9,256,230 B2 | 2/2016 | Matsuoka et al. |
| 9,342,082 B2 | 5/2016 | Guenette et al. |
| 9,447,983 B2 | 9/2016 | Smith et al. |
| 9,453,655 B2 | 9/2016 | Bruck et al. |
| 9,471,718 B2 | 10/2016 | Bukhin et al. |
| 9,605,857 B2 | 3/2017 | Secor |
| 2002/0016639 A1 | 2/2002 | Smith et al. |
| 2002/0178047 A1* | 11/2002 | Or ............... G06Q 10/04 705/412 |
| 2005/0234600 A1 | 10/2005 | Boucher et al. |
| 2008/0277486 A1 | 11/2008 | Seem et al. |
| 2011/0251739 A1 | 10/2011 | Tomas et al. |
| 2013/0211783 A1 | 8/2013 | Fisher et al. |
| 2013/0289772 A1* | 10/2013 | Friedrich ......... G05B 13/02 700/276 |
| 2014/0277765 A1 | 9/2014 | Karimi et al. |
| 2015/0095118 A1 | 4/2015 | Buchanan |
| 2015/0127167 A1 | 5/2015 | Quam et al. |
| 2015/0127170 A1 | 5/2015 | Quam et al. |
| 2015/0127171 A1 | 5/2015 | Quam et al. |
| 2015/0127172 A1 | 5/2015 | Quam et al. |
| 2015/0369502 A1 | 12/2015 | Turner |
| 2017/0052536 A1 | 2/2017 | Warner et al. |

* cited by examiner

PERFORMANCE OPTIMIZATION IN A BUILDING AUTOMATION SYSTEM

BACKGROUND

1. Technical Field

The present disclosure relates generally to building automation systems, and in particular, to systems and methods for monitoring, benchmarking, archiving and comparing performance of system controllers, unit controllers, wireless controllers and sensors, and prioritizing task execution in a building automation system.

2. Background of Related Art

Building automation system (BAS) controllers are used to coordinate, manage, and automate control of diverse environmental, physical, and electrical building subsystems, particularly HVAC and climate control systems but also including security, lighting, power, and the like. A typical BAS architecture consists of a system controller coupled to a number of unit controllers and environmental sensors via a data network. Unit controllers may be situated throughout the site and are typically associated with BAS components such as air handling units, variable air volume (VAV) units, compressors, air movers, chillers, furnaces, and ventilators, while environmental sensors may include temperature, humidity, and occupancy sensors. The data network utilized by the BAS may incorporate wired and wireless communication, and may for example utilize BACnet for wired connections and LONTalk or ZigBee for wireless connections.

Most, if not all, BAS devices utilize microcontroller or microprocessor-based control circuits to adjust the operation of the device and to communicate commands, status, and other data (e.g., firmware updates) among and between the BAS devices, user devices, and remote sites. Some BAS devices, such as the BAS controller, are able to run multiple processes concurrently and offer a high degree of flexibility which enables a variety of software applications to be installed on the device to perform many different functions.

The performance of each BAS device and the interactions between devices determines the overall effectiveness and operational success of the BAS. Communication errors, software defects and other malfunctions in the multitude of units which comprise a BAS can have a cascading effect and can be very difficult to identify and correct. A BAS system which addresses these shortcomings would be a welcome advance.

SUMMARY

In one aspect, the present disclosure is directed to a building automation system having at least one building automation device. The building automation system employs a method of improving building automation system performance. The method includes collecting a performance parameter associated with the building automation device and comparing the performance parameter to a corresponding performance benchmark. The performance benchmark is adjusted to match the corresponding performance parameter if the corresponding performance parameter exceeds the performance benchmark. The performance parameter and the identity of the building automation device associated with the performance parameter are transmitted to a remediation device if the corresponding performance parameter is less than the performance benchmark.

In some embodiments, the building automation system adjusts an operating parameter of the building automation device if its corresponding performance parameter is less than the performance benchmark. In some embodiments, the at least one building automation device is a building automation system controller and/or a unit controller. In some embodiments, the performance parameter and corresponding performance benchmark are an aggregated performance parameter and aggregated performance benchmark, respectively.

In some embodiments, the building automation system stores the performance parameter and the identity of the associated building automation device in a history database. In some embodiments, the performance parameter is transmitted from a performance monitoring agent included in the building automation device.

In some embodiments, the building automation system receives an operation request and determines if sufficient resources are available to complete the operation request. If sufficient resources are available, the operation request is performed, otherwise, a performance parameter which is less than a corresponding performance benchmark is identified.

In some embodiments, a real-time log of performance parameters and the identity of the associated building automation devices are displayed at the remediation device. In some embodiments, the real-time log is compared to historical performance parameters to identify a building automation device defect.

In another aspect, the present disclosure is directed to a building automation system having a building automation controller. The building automation controller includes a processor, a memory, and a building automation network interface. The building automation system includes a device controller in communication with the building automation controller. The memory includes a performance monitoring agent including a set of instructions which, when executed by the processor, causes the building automation controller to determine a performance parameter of a building automation software application executed by the building automation controller.

In some embodiments, the performance monitoring agent is configured to cause the building automation controller to determine a performance parameter of the device controller. In some embodiments, the building automation system includes a performance monitoring database in communication with the processor, and the performance monitoring agent is configured to cause the building automation controller to store the performance parameter into the performance monitoring database.

In some embodiments, the building automation system includes a build server in communication with the performance monitoring database. The build server is configured to query the performance monitoring database for performance parameters specified by a user, receive performance parameters corresponding to the search criteria, and present the received performance parameters to the user to facilitate remediation of a performance defect.

In some embodiments, the building automation system includes a log viewing device and a publication module configured to cause the building automation controller to transmit the performance parameter in real-time to the log viewing device.

In yet another aspect, the present disclosure is directed to a building automation system controller. The building automation controller includes a processor, a memory, and a building automation network interface. The memory includes a performance monitoring agent including a set of instructions which, when executed by the processor, causes the building automation controller to determine a performance parameter of a building automation software application executed by the building automation controller.

In some embodiments, the building automation software application is a building area layout application, a chiller plant control application, a data logging application, a variable air volume system application, a user interface, a global referencer application, a reporting application, a backup and restore application, and/or a logger application. In some embodiments, the performance parameter is determined from a network response time, an analog input point, an analog output point, an analog value point, a binary input point, a binary output point, a binary value point, a multistate input point, a multistate output point, and/or a multistate value point.

In some embodiments, the performance monitoring agent is configured to cause the building automation controller to determine a performance parameter of a device controller coupled to the building automation system controller by the building automation network interface. In some embodiments, the performance monitoring agent is configured to cause the building automation controller to adjust an operating parameter of the device controller.

In some embodiments, the building automation system includes a performance monitoring database in communication with the processor, and the performance monitoring agent is configured to cause the building automation controller to store the performance parameter into the performance monitoring database.

BRIEF DESCRIPTION OF THE DRAWINGS

Various embodiments of the disclosed system and method are described herein with reference to the drawings wherein.

Figure 1:
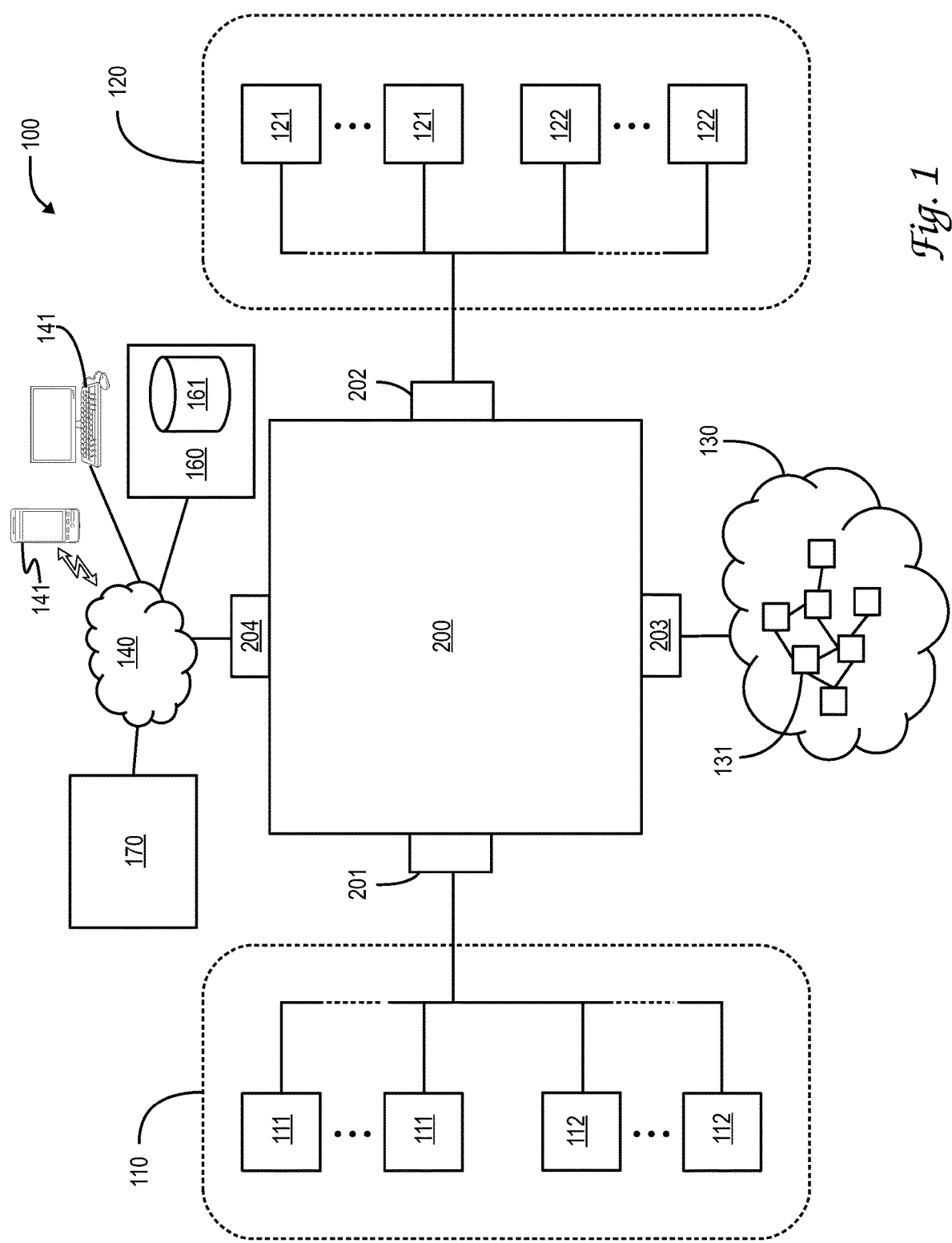
FIG. 1 is a block diagram of a building automation system (BAS) in accordance with an embodiment of the present disclosure.

The various aspects of the present disclosure mentioned above are described in further detail with reference to the aforementioned figures and the following detailed description of exemplary embodiments.

DETAILED DESCRIPTION

The present disclosure is directed to systems and methods to monitor, benchmark, archive, and compare performance of the system controller, unit controllers, wireless controllers, and sensors of a BAS. This is accomplished by collecting various parameters of the embedded hardware and software, installed software programs and applications, and BAS network parameters. Those parameters deemed to impact the performance of the embedded systems and unit controllers, wireless controllers, and sensors of the BAS system are collected by an analysis engine. In addition, the execution of critical tasks is prioritized to ensure such tasks are executed in those situations where the BAS system controller is overloaded.

The collected parameters are monitored over a period of time and archived in a database for analysis. The collected results are compared with previously-established benchmark data to determine if a system performance or quality defect exists. Results are correlated with particular events which may occur in the BAS system to differentiate performance data collected between various events in and to identify potential problem areas. The data may be exported in various file formats to enable users to process the data in any desired manner, e.g., in spreadsheet format, portable document format (.pdf), email, and so forth. Multiple system controllers and unit controllers may be monitored in a single user interface.

In one aspect, the present invention enables developers to identify and resolve problems in production BAS units deployed in the field, without needing a user or technician to lodge a trouble report, thereby streamlining and expediting the product improvement cycle. In many cases, a problem will be resolved remotely without needing a technician to visit the site, for example, to apply a software patch. Using the present invention, a user is able to view and record current system and unit controllers' performance during different cycle times of the system like start-up, peak time, etc. Current BAS performance may be compared to benchmark data using live dashboards to view performance parameters in numerical and graphic format live both in data mode as well as in a charts mode, and export the performance data for future reference. Multiple BASs may be monitored in a single dashboard, and performance data may be imported and exported to facilitate analysis with external analytical tools or for comparison with other data sets.

The systems and methods disclosed herein may be advantageously employed in building automation systems such as those disclosed in U.S. Pat. No. 8,050,801, filed Aug. 22, 2005, issued Nov. 1, 2011, and entitled "Dynamically Extensible and Automatically Configurable Building Automation System and Architecture"; U.S. Pat. No. 8,099,178, filed Dec. 22, 2005, issued Jan. 17, 2012, and entitled "Building Automation System Facilitating User Customization"; U.S. Pat. No. 7,904,186, filed Dec. 22, 2005, issued Mar. 8, 2011, and entitled "Building Automation System Facilitating User Customization"; U.S. Pat. No. 8,024,054, filed Dec. 22, 2005, issued Sep. 20, 2011, and entitled "Building Automation System Facilitating User Customization"; U.S. Pat. No. 7,870,090, filed Dec. 22, 2005, issued Jan. 11, 2011, and entitled "Building Automation System Data Management"; U.S. Pat. No. 8,055,386, filed Dec. 22, 2005, issued Nov. 8, 2011, and entitled "Building Automation System Data Management"; U.S. Pat. No. 8,055,387, filed Dec. 22, 2005, issued Nov. 8, 2011, and entitled "Building Automation System Data Management"; U.S. Pat. No. 7,917,232, filed Dec. 22, 2005, issued Mar. 29, 2011, and entitled "Building Automation System Data Management"; and U.S. Pat. No. 8,290,627, filed Dec. 22, 2005, issued Oct. 16, 2012, and entitled "Dynamically Extensible and Automatically Configurable Building Automation System and Architecture," all of which are assigned to the applicant of the present disclosure, and are hereby incorporated by reference herein for all purposes.

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but as a basis for the claims and an exemplary basis for teaching one skilled in the art to variously employ the present disclosure in any appropriately-detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary." The phrases "such as" and "for example" as used herein are to be interpreted in a non-limiting sense.

Aspects of the present disclosure are described herein in terms of functional block components and various processing steps. It should be appreciated that such functional blocks configured to perform the specified functions may be embodied in mechanical devices, electromechanical devices, analog circuitry, digital circuitry, and/or modules embodied in a computer. For example, the present disclosure may employ various discrete components, integrated circuit components (e.g., memory elements, processing elements, logic elements, look-up tables, and the like) which may carry out a variety of functions, whether independently, in cooperation with one or more other components, and/or under the control of one or more processors or other control devices. One skilled in the art will also appreciate that, for security reasons, any element of the present disclosure may includes any of various suitable security features, such as firewalls, access codes, authentication, encryption, de-encryption, compression, decompression, and/or the like. It should be understood that the steps recited herein may be executed in any order and are not limited to the order presented. Moreover, two or more steps or actions recited herein may be performed concurrently.

FIG. 1 illustrates an exemplary embodiment of a building automation system (BAS) 100 according to the present disclosure. BAS 100 includes a BAS controller 200 that is communicatively coupled with a number of building automation networks (BAN) 110, 120, 130 which facilitate communication between BAS system controller 200 and any number of BAS unit controllers 111 and environmental sensors 112. The unit controllers 111 may be operatively associated with a range of devices including, but not limited to, HVAC equipment such as chillers, air handlers, furnaces, or boilers with multiple data sensors producing a continuous stream of data, and variable air volume (VAV) boxes and dampers. Environmental sensors 112 will include temperature sensors, humidity sensors, gas sensors such as $CO_2$ sensors, and occupancy sensors.

In the present example, BAS controller 200 is equipped with a BACnet communications interface 201 which couples BAS controller 200 to BACnet building automation network 110. In the FIG. 1 embodiment, BACnet 110 operates using the BACNet protocol promulgated by the American National Standards Institute (ANSI) and the American Society of Heating, Refrigerating and Air-Conditioning Engineers (ASHRAE). BACnet is a master-slave token passing (MSTP) protocol implemented on an RS485/EIA485 physical layer. It is envisioned that embodiments of the present disclosure may be advantageously employed with BACnet building automation networks operating according to any BACnet standard now or in the future known, including without limitation, ANSI/ASHRAE Standard 135-1995, ANSI/ASHRAE Standard 135.1-2003, ANSI/ASHRAE Standard 135-2004, ANSI/ASHRAE Standard 135.1-2007, and BACnet-2008.

Still referring to FIG. 1, BAS controller 200 is equipped with a LON communications interface 202 which couples BAS controller 200 to a LON building automation network 120. LON network 120 operates according to the LONTalk® protocol standard promulgated by Echelon Corp of Santa Clara, Calif., USA. LON 120 includes a number of LONTalk®-capable networked unit controllers 121 and environmental sensors 122.

BAS controller 200 includes a ZigBee® communications interface 203 which couples BAS controller 200 to a Zigbee® building automation network 130. ZigBee® network 130 is a wireless mesh network that operates in accordance with standards published by The ZigBee Alliance of San Ramon, Calif., USA. ZigBee® is based on the IEEE 802.15.4 standard for low-power wireless devices, and while often employed with low power, low-cost battery powered end devices 131 such as, without limitation, temperature sensors, humidity sensors, and $CO_2$ sensors, ZigBee® may be employed with any end device suitable for use in BAS 100.

BAS controller 200 includes a data network interface 204 such as an Ethernet interface and/or an 802.11 WiFi interface for communicating with to one or more user devices 141 over a data network 140, such as a private LAN and/or the public Internet. User devices 141 may include, without limitation, a mobile telephone, smart phone, tablet device, smart watch, pager, notebook computer, and/or a desktop computer. A monitoring server 160 is communicatively coupled to BAS controller 200 via data network 140 and includes performance monitoring database (PMD) 161 to facilitate the storing and analysis of collected performance data. BAS 100 includes build server 170 which receives performance data to enable design engineers, software developers, testers, and support personnel to access and respond to performance data.

Figure 2:
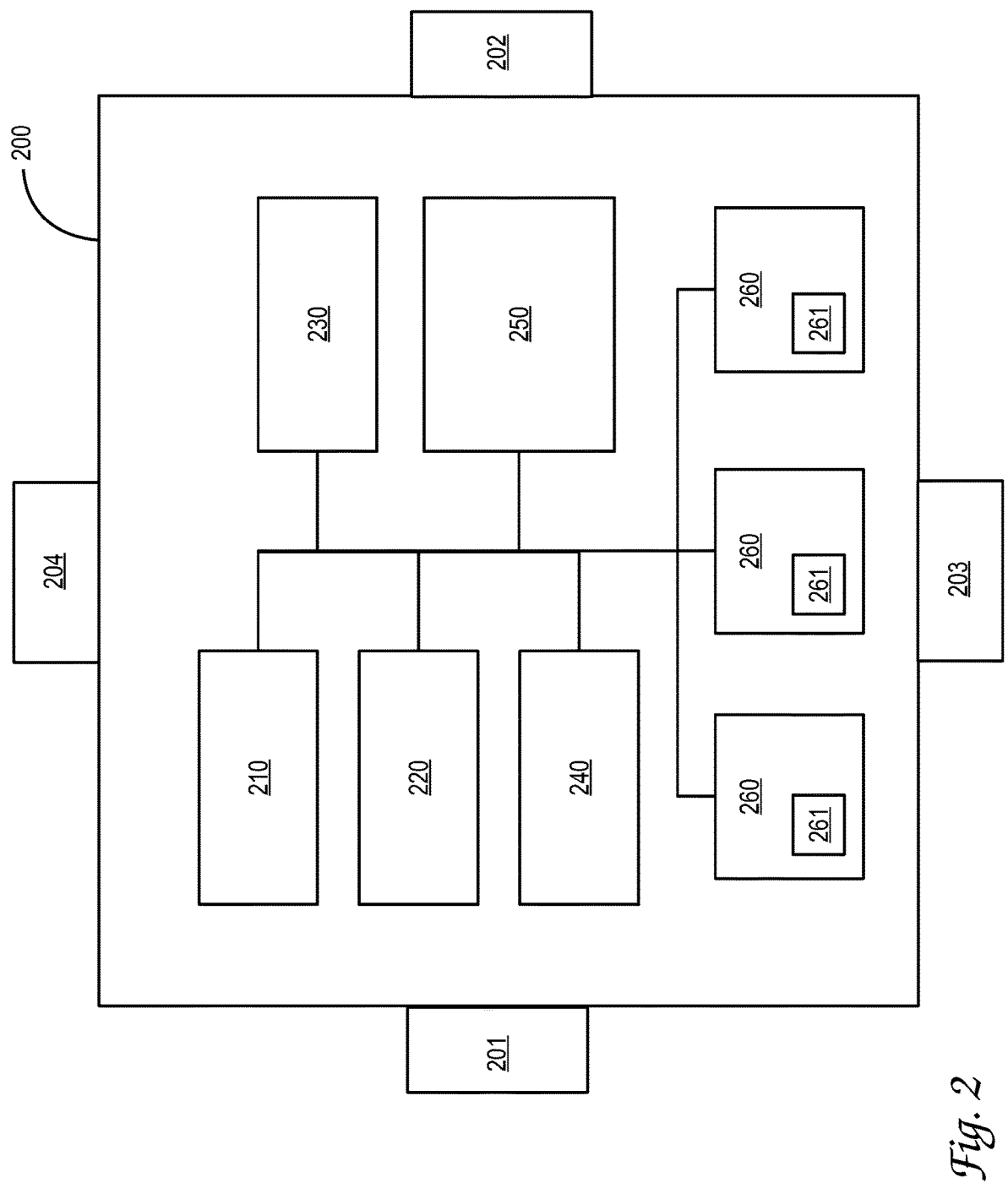
FIG. 2 is a detailed block diagram of a BAS controller in accordance with an embodiment of the present disclosure.

Referring now to FIG. 2, BAS controller 200 includes a processor 210 in operative communication with a memory 220, a user interface 230, data store 240, performance monitoring module (PMM) 250, and one or more installed software applications 260. In this example embodiment, memory 220 comprises RAM memory which can be used, for example, for storage of transient data, computed and intermediate results, I/O buffering, GUI buffering, and program execution. Data storage 240 comprises non-volatile storage such as a flash drive, EEPROM, ROM, magnetic hard disk, solid state disk (SSD), hybrid drives (combination hard disk/SSD) which can be used for storage of data which persists through power cycling. Installed software application 260 includes a performance monitoring agent (PMA) 261 which collects performance data. Examples of performance data include, without limitation, volatile RAM utilization of the application, non-volatile RAM (NVRAM) utilization of the application, processor utilization of the application, storage utilization, bandwidth being used by the various HVAC communications links (BACnet, LonTalk, Modbus, IMC), time slice/run time information, and so forth. PMA 261 includes a watchdog timer to detect conditions where the associated software application 260 hangs or become unresponsive. In embodiments, a PMA 261 is included in one or more unit controllers 111, 121, one or more sensors 112, 122, and/or one or more end devices 131 to monitor and report the performance thereof.

While the example embodiments discussed herein describe a single BAS, it should be understood that embodiments of the present disclosure may be utilized in a distributed, multiple-BAS system in which data from multiple systems is aggregated, collected, processed, monitored and/or otherwise utilized by a centralized or enterprise-level control system. One example of an enterprise-level BAS suitable for use with the disclosed techniques is the Trane Tracer™ ES sold by Trane International Inc.

Figure 3:
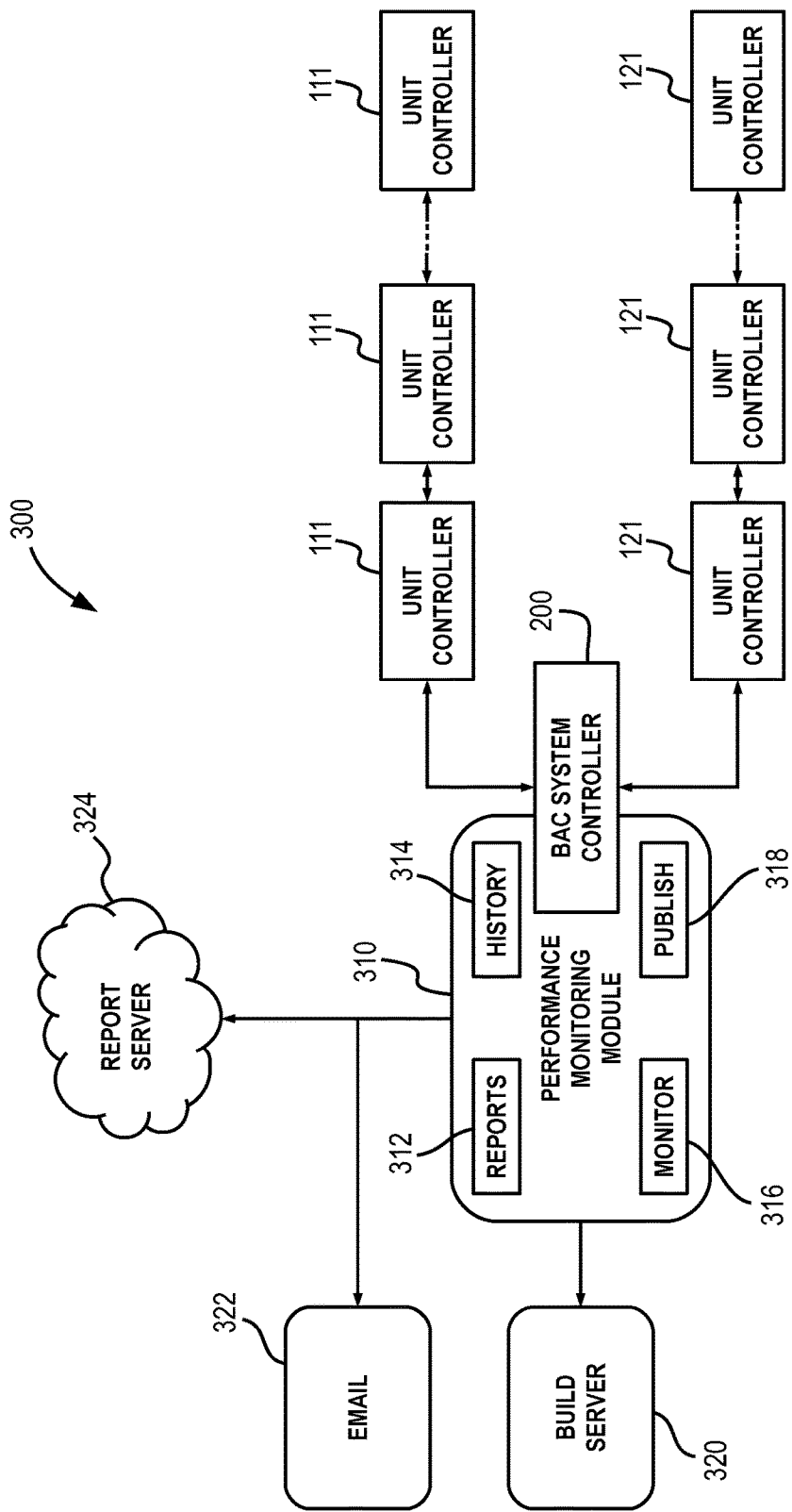
FIG. 3 is an architectural diagram of a BAS performance monitoring system in accordance with an embodiment of the present disclosure.

Turning now to FIG. 3, a BAS performance monitoring system 300 in accordance with an embodiment of the present disclosure includes a performance monitoring module (PMM) 310 in operational association with BAS system controller 200. One or more unit controllers 111, 121 are communicatively coupled to BAS system controller 200 via a building automation system network. Performance data received from unit controllers 111, 121 by BAS system controller 200 is collected by PMM 310. In addition, performance data generated by BAS system controller 200 is also collected by PMM 310. For example, performance data may include command response times, alarm or error conditions, resource usage (e.g., low device memory), sensed environmental conditions, hardware and software version identifiers (release number, hash, or checksum), and so forth.

PMM 310 includes a reporting module 312, a history database 314, a real-time monitor 316, and a publication module 318. Performance data received by PMM 310 is archived in history database 314 to facilitate instant or future analysis of device metrics, and the establishment of performance benchmarks for each particular device type. In a preferred embodiment, history database 314 is configured to store a year's worth of data in the database for future use. However, history database 314 may be configured to store data for any duration of time. Real-time monitor 316 evaluates incoming performance data to determine if individual device performance metrics meet or exceed an established performance benchmark, or fall below a benchmark. Real-time monitor 316 communicates the performance parameters and benchmarking results to history database 314. Additionally or alternatively, benchmarking results are communicated to reporting module 312 which is configured to provide benchmarking results in human-readable form to enable users and developers to proactively identify performance issues and benchmark data, to compare various collected performance report of the BAS system with each other to identify areas for improvement, and so forth. Reporting module 312 may in certain embodiments include an ad hoc query and report generator to enable users to obtain performance information in a targeted manner, to display and compare relationships between various performance parameters of the BAS controller 200 and unit controllers 111, 121 in the BAS system, and to provide a quick way for a user to conceptualize and visualize performance metrics, trends, and so forth. Report server 324 aggregates performance data collected by one or more PMMs 310 to correlate data from among a population of BASs to identify trends and anomalies which may elude detection when isolated to a single BAS.

Publication module 318 provides a portal to facilitate the sharing of performance data with online data consumers and may include a web portal, data APIs based on REST, SOAP, XML, or another suitable data exchange protocol. In a preferred embodiment, publication module 318 provides a data feed from the BAS to a log viewing application usable by a developer, tester, or support personnel. The data feed is preferably a real-time data feed, however, saved or archived data may be provided as well. Log data forwarded to a remote machine may be filtered based on date, application type, and log content. Log data may be collected in the cloud from various systems and analyzed to identify performance issues or to provide support services, and logs from multiple systems may be viewed in a single window for comparison and trend analysis.

Build server 320 includes a software development platform which enables software updates (patches, firmware, new releases) that have been released to address performance issues to be applied to BAS controller 200 and/or unit controllers 111, 121. Email server 322 is configured to provide email alerts to designated users when a performance issue is identified, a new software release is identified, and so forth.

Figure 4:
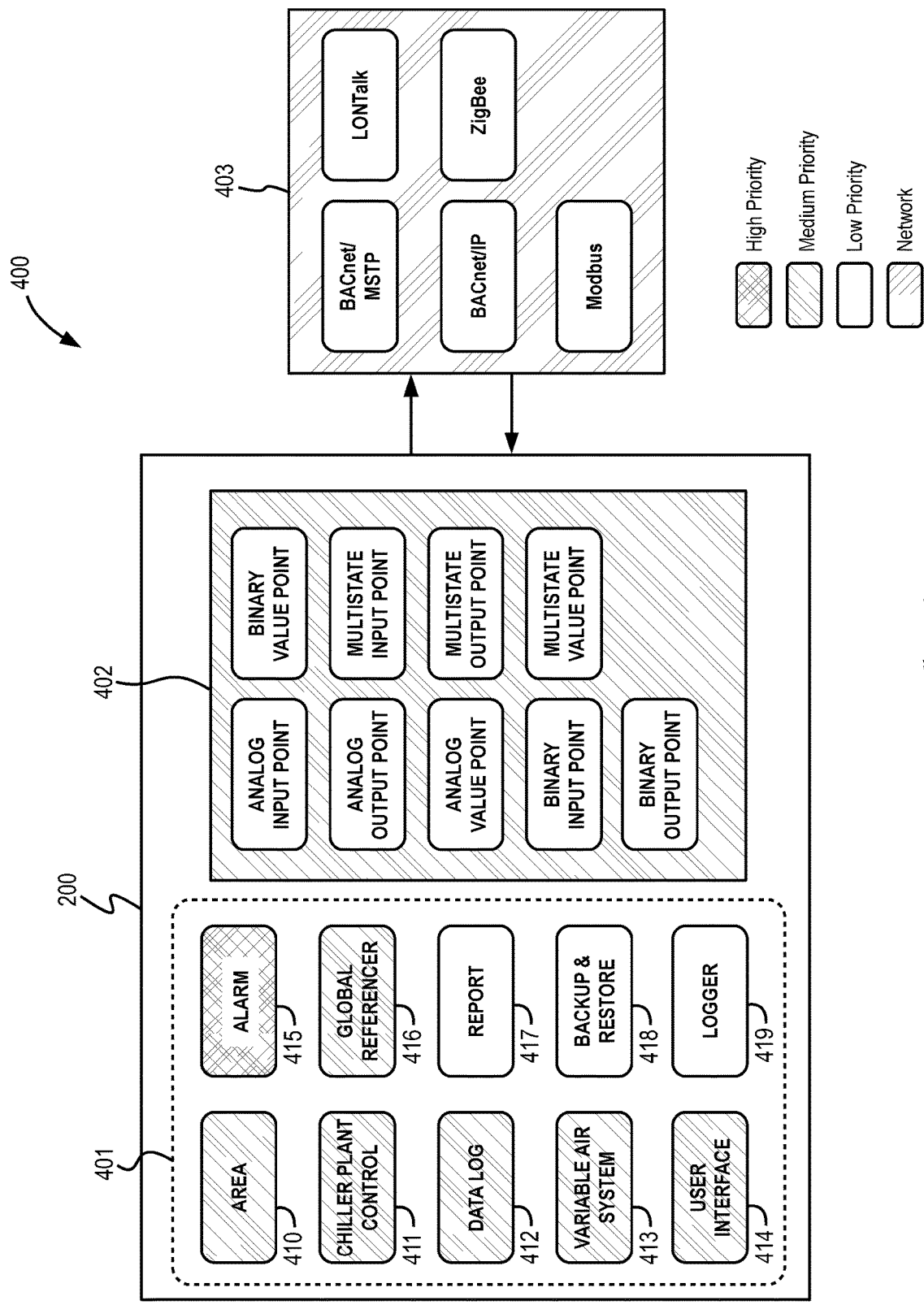
FIG. 4 is a illustrates an exemplary performance-optimized BAS controller in accordance with an embodiment of the present disclosure.

FIG. 4 depicts another aspect of BAS controller 200 showing performance data collection from installed applications 401, value triggers 402, and building automation networks 403. In the FIG. 4 example BAS controller 200 includes an alarm application 415 which executes at the highest priority to provide instant notifications about critical or regular events to the user; a number of medium-priority applications including a building area layout application 410, a chiller plant control application 411 that controls sequences for chilled water systems, a user-facing data logging application 412 that records samples of HVAC properties over time, a VAV system control application 413 that is configured to meet the varying heating and cooling needs of different building zones, a UI 414, and a global referencer application 416 that monitors and controls a property in a remote application or controller; and low-priority application including a reporting application 417 that generates periodic reports about the configured properties, a backup and restore application 418 that backs up the controller configuration based on the configuration and restores data when needed, and a logger application 419 records or "logs" data of embedded application and the controller into a log file or database in the controller. Logger application 419 collects debug and diagnostic information which is typically used by developers and technical support people to troubleshoot issues.

One of the metrics gathered is timeslice utilization. In other words, in a multitasking computing environment, an application is given a specific amount or "slice" of time to run. To determine timeslice utilization, the actual time it takes for an application to run is compared against the allotted timeslice. Another metric is related to the number of instances running of each of these applications, for example, the number of analog input points, number of areas, number of global referencers, and so on.

BAS controller 200 includes a number of value triggers 402 which include analog I/O ports and internal analog values; binary I/O ports and internal binary values; and multistate I/O ports and internal multistate values. Multistate values represent device operating states, such as "FAN:ON/OFF/AUTO" and so forth. BAS controller 200 communicates via network 403 to one or more BAS devices using any suitable BAS network protocol, such as without limitation, BACnet/MSTP (master slave token passing), BACnet over IP, Modbus, LONtalk, ZigBee, and so forth.

During use, data log application 412 collects performance data from at least one of the other applications 401 and/or value triggers 402. Additionally or alternatively, one or more applications 401 includes a performance monitoring agent (PMA) which collects performance data. Data log application 412 may be configured to monitor traffic between BAS controller 200 and network 403 to discern, for example, communication response times between network nodes, protocol errors, alarm or error conditions, and the like which might otherwise go undetected.

Figure 5:
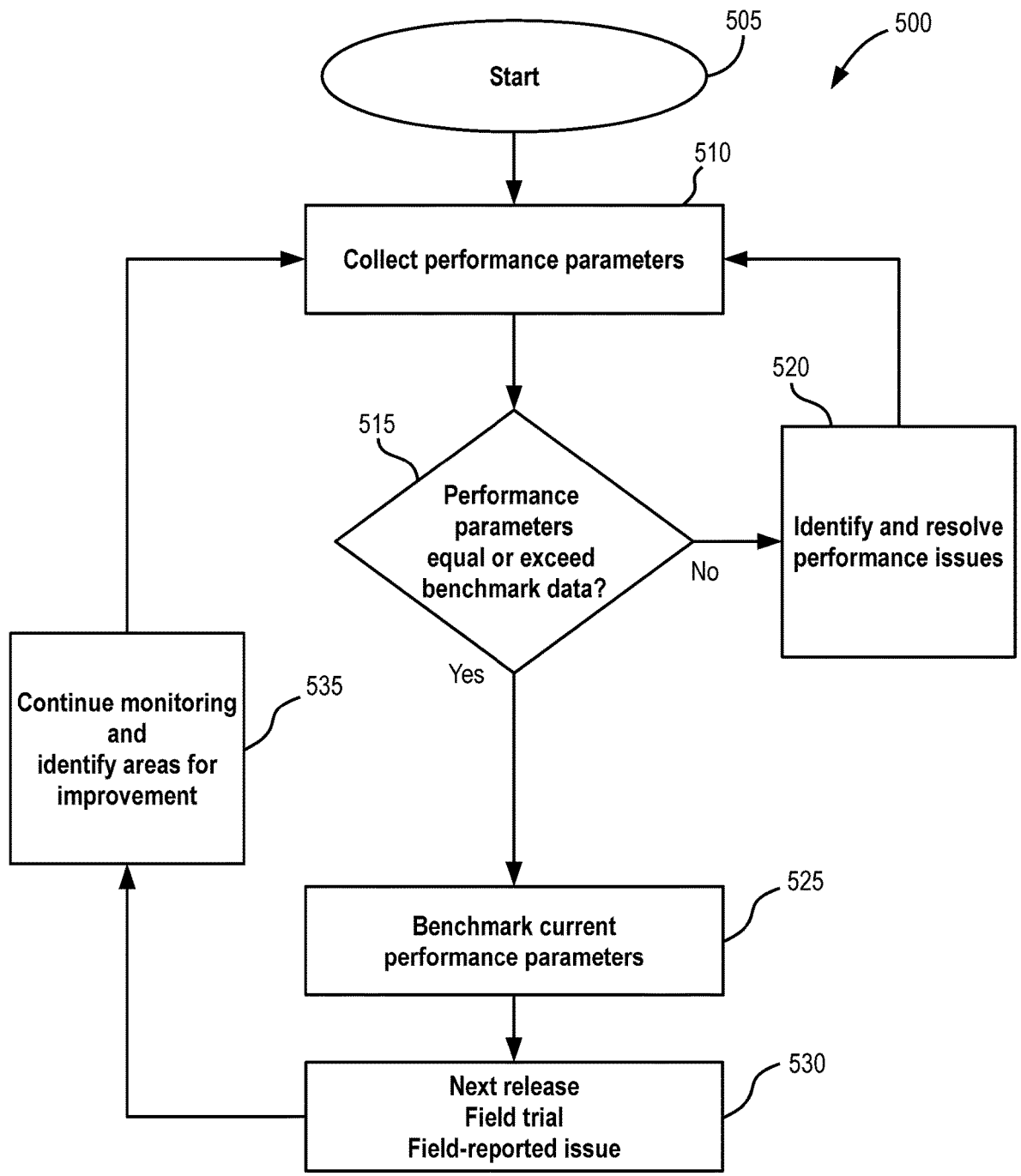
FIG. 5 is a flowchart illustrating a method of performance monitoring and benchmarking in a BAS in accordance with an embodiment of the present disclosure.

With reference now to FIG. 5, a method 500 of monitoring, benchmarking, archiving, and comparing performance of BAS components in accordance with the present disclosure is shown. The method 500 initializes at step 505, and at step 510 begins collecting performance parameters from components of the BAS. In a preferred embodiment, performance parameters are collected from at least one BAS system controller and one or more BAS unit controllers. Additionally or alternatively, performance parameters are collected from any wireless controllers, and/or sensors of the monitored BAS.

At step 515, the received performance parameters are compared to a corresponding performance benchmark. The comparison may optionally be made between each individual performance parameter to its benchmark or between an aggregated group of related performance parameters to an aggregate benchmark. In this manner, individual performance issues as well as system-wide issues may be detected. For example, a unit controller showing excessively long response times might indicate an issue with the unit controller itself or perhaps an isolated communication link, while an excessive aggregate response time among a plurality of unit controller might indicate an overall network congestion situation.

At step 520, any performance parameters which fall short of the established benchmark performance, either individually or in aggregate, are identified and resolved. Performance data and reports are conveyed to a developer as described hereinabove to facilitate a long-term solution where applicable. Additionally or alternatively, the deficient performance data may be used to dynamically adjust or tune one or more BAS components to resolve the performance issue in real-time.

At step 525, any current performance parameter (individual or aggregate) which exceeds the existing benchmark is assigned as a new benchmark for that parameter for future releases (hardware, software, firmware, usage and process specifications, and the like) of the underlying device evaluated by the parameter (step 530). That is, when a new software version is released, the performance metrics are gathered and archived. Those metrics serve as benchmarks for that particular release. If a better performance is achieved than the previous benchmarked results (e.g., of a previous version) than the new performance data will be saves as a new benchmark. At step 535, performance parameters from the subject BAS are monitored and analyzed to identify areas of improvement based on, for example, historical or statistical analysis of archived performance parameters, and the method 500 iterates to step 510 for further ongoing collection of performance parameters.

Figure 6:
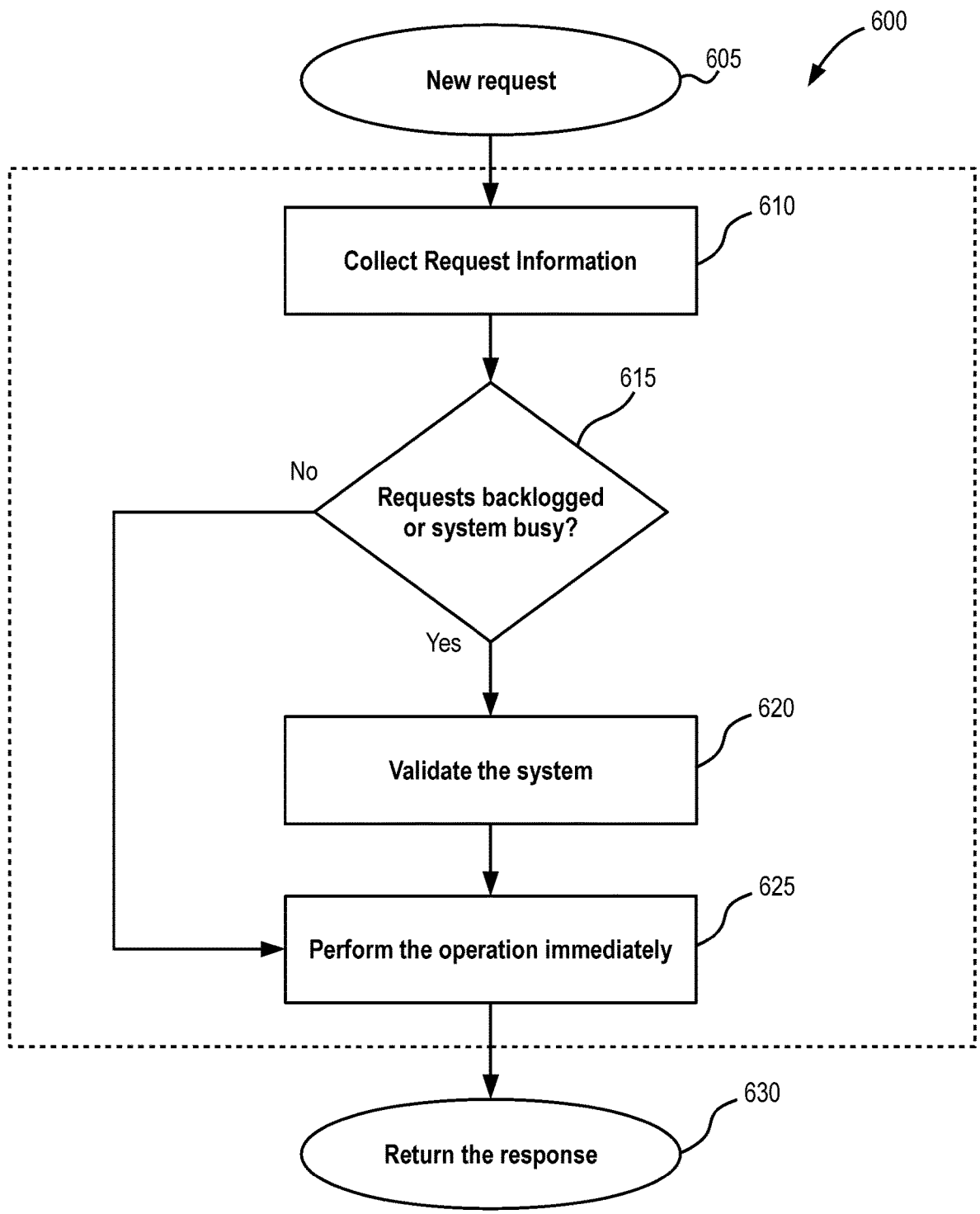
FIG. 6 is a flowchart illustrating a method of prioritization in a BAS in accordance with an embodiment of the present disclosure.

Turning now to FIG. 6, a method 600 of prioritizing operation of a BAS controller based on collected performance parameters is illustrated. At step 605, a new operation request is received. Examples of an operation requests include without limitation a request to change an operational mode of a unit controller, a status request, an incoming alarm, a BAS UI input (e.g., perform a backup, set system time), and so forth. At step 610, information concerning the request is collected. For example, additional information necessary to complete the request may be solicited from the request originator and/or supplemental information relating to the request may be ascertained. Supplemental information may include obtaining confirmation to execute the command, obtaining additional command parameters or options, etc. At step 615, the current BAS load is evaluated to determine whether sufficient processing, network, power, environmental, or other BAS resources are available to successfully fulfill the request. If sufficient resources are available, the requested operation is performed immediately at step 625. If insufficient resources exist, system validation step 620 is performed wherein collected performance parameters are evaluated to determine which, if any, fall below their corresponding baseline standards to identify a potential cause for the resource bottleneck, and optionally take corrective action. The performance parameter data can be used in real time by the system to automatically improve performance, for example, to dynamically grow or shrink the number of worker threads available to service queued work or tasks. Another non-limiting example would be to dynamically create additional data points of various types based on overall system resource availability. Once sufficient resources have become available, the requested command is performed at step 625. At step 630, a request response is returned to the request originator.

ASPECTS

It is noted that any of aspects 1-20 may be combined with each other in any suitable combination.

Aspect 1. In a building automation system having at least one building automation device, a method of improving building automation system performance comprising collecting a performance parameter associated with the building automation device; comparing the performance parameter to a corresponding performance benchmark; adjusting the performance benchmark to match the corresponding performance parameter if the corresponding performance parameter exceeds the performance benchmark; and transmitting the performance parameter and the identity of the building automation device associated therewith to a remediation device if the corresponding performance parameter is less than the performance benchmark.

Aspect 2. The building automation system in accordance with aspect 1, further comprising adjusting an operating parameter of the building automation device if the corresponding performance parameter is less than the performance benchmark.

Aspect 3. The building automation system in accordance with aspect 1 or 2, wherein the at least one building automation device comprises a building automation system controller and/or a unit controller.

Aspect 4. The building automation system in accordance with any of aspects 1-3, wherein the performance parameter and corresponding performance benchmark are an aggregated performance parameter and aggregated performance benchmark, respectively.

Aspect 5. The building automation system in accordance with any of aspects 1-4, further comprising storing the performance parameter and the identity of the building automation device associated therewith in a history database.

Aspect 6. The building automation system in accordance with any of aspects 1-5, further comprising transmitting the performance parameter from a performance monitoring agent included in the building automation device.

Aspect 7. The building automation system in accordance with any of aspects 1-6, further comprising receiving an operation request; determining if sufficient resources are available to complete the operation request; performing the operation request in response to a determination that sufficient resources are available; and identifying a performance parameter which is less than a corresponding performance benchmark thereof in response to a determination that sufficient resources are not available.

Aspect 8. The building automation system in accordance with any of aspects 1-7, further comprising displaying, at the remediation device, a real-time log of performance parameters and the identity of building automation devices respectively associated therewith.

Aspect 9. The building automation system in accordance with any of aspects 1-8, further comprising comparing, at the remediation device, the real-time log to historical performance parameters to identify a building automation device defect.

Aspect 10. A building automation system, comprising a building automation controller comprising a processor, a memory, and a building automation network interface; a device controller in communication with the building automation controller; wherein the memory includes a performance monitoring agent comprising a set of instructions which, when executed by the processor, causes the building automation controller to determine a performance parameter of a building automation software application executed by the building automation controller.

Aspect 11. The building automation system in accordance with aspect 10, wherein the performance monitoring agent further comprises instructions which, when executed by the processor, causes the building automation controller to determine a performance parameter of the device controller.

Aspect 12. The building automation system in accordance with aspect 10 or 11, further comprising a performance monitoring database in communication with the processor, wherein the performance monitoring agent further comprises instructions which, when executed by the processor, causes the building automation controller to store the performance parameter into the performance monitoring database.

Aspect 13. The building automation system in accordance with any of aspects 10-12, further comprising a build server in communication with the performance monitoring database, wherein the build server is configured to query the performance monitoring database for performance parameters specified by a user; receive performance parameters corresponding to the search criteria; and present the received performance parameters to the user to facilitate remediation of a performance defect.

Aspect 14. The building automation system in accordance with any of aspects 10-13, further comprising a log viewing device; and a publication module comprising a set of instructions which, when executed by the processor, causes the building automation controller to transmit the performance parameter in real-time to the log viewing device.

Aspect 15. A building automation system controller, comprising a processor; a memory; and a building automation network interface; wherein the memory includes a performance monitoring agent comprising a set of instructions which, when executed by the processor, causes the building automation controller to determine a performance parameter of a building automation software application executed by the building automation controller.

Aspect 16. The building automation system controller in accordance with aspect 15, wherein the building automation software application is selected from the group consisting a building area layout application, a chiller plant control application, a data logging application, a variable air volume system application, a user interface, a global referencer application, a reporting application, a backup and restore application, and a logger application.

Aspect 17. The building automation system controller in accordance with aspect 15 or 16, wherein the performance parameter is determined at least in part from a network response time, an analog input point, an analog output point, an analog value point, a binary input point, a binary output point, a binary value point, a multistate input point, a multistate output point, and a multistate value point.

Aspect 18. The building automation system controller in accordance with any of aspects 15-17, wherein the performance monitoring agent further comprises instructions which, when executed by the processor, causes the building automation controller to determine a performance parameter of a device controller coupled to the building automation system controller by the building automation network interface.

Aspect 19. The building automation system in accordance with aspects 15-18, wherein the performance monitoring agent further comprises instructions which, when executed by the processor, causes the building automation controller to adjust an operating parameter of the device controller.

Aspect 20. The building automation system in accordance with aspects 15-19, further comprising a performance monitoring database in communication with the processor, wherein the performance monitoring agent further comprises instructions which, when executed by the processor, causes the building automation controller to store the performance parameter into the performance monitoring database.

Particular embodiments of the present disclosure have been described herein, however, it is to be understood that the disclosed embodiments are merely examples of the disclosure, which may be embodied in various hardware and software forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. In a building automation system having at least one building automation device configured as a building automation system controller and at least one building automation device configured as a unit controller, a method of improving building automation system performance comprising:
    collecting a performance parameter associated with the building automation device configured as a building automation system controller, wherein the performance parameter is indicative of a performance of the building automation system controller in managing the building automation system and the performance parameter is determined based on a network response time of commands issued by the building automation system controller;
    comparing the performance parameter to a corresponding performance benchmark;
    changing the performance benchmark to the corresponding performance parameter if it is determined the corresponding performance parameter exceeds the performance benchmark; and
    transmitting the performance parameter and an identity of the building automation device associated therewith to a remediation device if the corresponding performance parameter is less than the performance benchmark.

2. The method of claim 1, further comprising adjusting an operating parameter of the building automation device if the corresponding performance parameter is less than the performance benchmark.

3. The method of claim 1, wherein the performance parameter and corresponding performance benchmark are an aggregated performance parameter and aggregated performance benchmark, respectively.

4. The method of claim 1, further comprising storing the performance parameter and the identity of the building automation device associated therewith in a history database.

5. The method of claim 1, further comprising transmitting the performance parameter from a performance monitoring agent included in the building automation device.

6. The method of claim 1, further comprising:
receiving an operation request;
determining if sufficient resources are available to complete the operation request;
performing the operation request in response to a determination that sufficient resources are available; and
identifying a second performance parameter which is less than a second corresponding performance benchmark thereof in response to a determination that sufficient resources are not available.

7. The method of claim 1, further comprising displaying, at the remediation device, a real-time log of performance parameters and the identity of building automation devices respectively associated therewith.

8. The method of claim 7, further comprising comparing, at the remediation device, the real-time log to historical performance parameters to identify a building automation device defect.

9. The method of claim 1, further comprising:
providing, to the building automation device configured as a building automation system controller, a building automation software application,
wherein the performance parameter includes a timeslice utilization of the building automation software application.

10. A building automation system controller for a building automation system, comprising:
a processor;
a memory; and
a building automation network interface;
wherein the memory includes a performance monitoring agent comprising a set of instructions which, when executed by the processor, causes the building automation device to at least:
collect a performance parameter associated with the building automation system controller, wherein the performance parameter is indicative of a performance of the building automation system controller in managing the building automation system, and the performance parameter is determined based on a network response time of commands issued by the building automation system controller;
compare the performance parameter to a corresponding performance benchmark;
change the performance benchmark to the corresponding performance parameter if it is determined the corresponding performance parameter exceeds the performance benchmark; and
transmit the performance parameter and an identity of the building automation system controller associated therewith to a remediation device if the corresponding performance less than the performance benchmark.

11. The building automation system controller in accordance with claim 10, wherein the performance parameter is of a building automation software application executed by the building automation system controller, and the performance monitoring agent further comprises instructions which, when executed by the processor, causes the building automation system controller to determine a performance parameter of a unit controller coupled to the building automation system controller by the building automation network interface.

12. The building automation system in accordance with claim 10, wherein the memory further includes a publication module comprising a set of instructions which, when executed by the processor, causes the building automation system controller to transmit the performance parameter in realtime to a log viewing device.

13. The building automation system controller in accordance with claim 10, wherein the performance parameter is of a building automation software application executed by the building automation system controller, and the building automation software application is selected from the group consisting of a building area layout application, a chiller plant control application, a data logging application, a variable air volume system application, a user interface, a global referencer application, a reporting application, a backup and restore application, and a logger application.

14. The building automation system controller in accordance with claim 10, wherein the performance parameter is determined based on the response time and further based at least in part on at least one of: an analog input point, an analog output point, an analog value point, a binary input point, a binary output point, a binary value point, a multistate input point, a multistate output point, and a multistate value point.

15. The building automation system controller in accordance with claim 10, wherein the performance monitoring agent further comprises instructions which, when executed by the processor, causes the building automation system controller to determine a performance parameter of a unit controller coupled to the building automation system controller by the building automation network interface.

16. The building automation system in accordance with claim 15, wherein the performance monitoring agent further comprises instructions which, when executed by the processor, causes the building automation system controller to adjust an operating parameter of the unit controller.

17. The building automation system in accordance with claim 10, further comprising a performance monitoring database in communication with the processor, wherein the performance monitoring agent further comprises instructions which, when executed by the processor, causes the building automation system controller to store the performance parameter into the performance monitoring database.

18. The building automation system in accordance with claim 17, wherein the performance monitoring database is configured to communicate with a build server that is configured to receive performance parameters specified by a user, from the performance monitoring database, responsive to a query from the build server, the received performance parameters presentable to the user to facilitate remediation of a performance defect.

* * * * *